United States Patent
Aoki

(10) Patent No.: US 9,662,739 B2
(45) Date of Patent: May 30, 2017

(54) SPOT WELDING SYSTEM FOR MANAGING ELECTRODE INSPECTION AND ROBOT USED THEREFOR

(71) Applicant: FANUC CORPORATION, Minamitsuru-gun, Yamanashi (JP)

(72) Inventor: Toshimichi Aoki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 88 days.

(21) Appl. No.: 14/607,390

(22) Filed: Jan. 28, 2015

(65) Prior Publication Data

US 2015/0209891 A1 Jul. 30, 2015

(30) Foreign Application Priority Data

Jan. 29, 2014 (JP) ................................ 2014-014304

(51) Int. Cl.
| | |
|---|---|
| G06T 7/00 | (2017.01) |
| B23K 11/30 | (2006.01) |
| B23K 11/11 | (2006.01) |
| B23K 37/02 | (2006.01) |

(52) U.S. Cl.
CPC ......... *B23K 11/3063* (2013.01); *B23K 11/115* (2013.01); *B23K 37/0258* (2013.01); *G06T 7/001* (2013.01); *G06T 7/0004* (2013.01); *G06T 2207/30152* (2013.01)

(58) Field of Classification Search
None
See application file for complete search history.

(56) References Cited

U.S. PATENT DOCUMENTS

| | | | | |
|---|---|---|---|---|
| 6,151,124 A | * | 11/2000 | Visscher | ................ G01N 21/55 356/445 |
| 2006/0157533 A1 | * | 7/2006 | Onoue | ................... B23K 9/095 228/8 |
| 2011/0180516 A1 | * | 7/2011 | Takahashi | ............ B23K 11/255 219/86.41 |
| 2012/0200695 A1 | * | 8/2012 | Yamane | ................. G01B 11/08 348/90 |

FOREIGN PATENT DOCUMENTS

| | | |
|---|---|---|
| CN | 1096912 | 12/2002 |
| CN | 102139399 | 8/2011 |
| DE | 102011009379 | 9/2011 |
| DE | 102010056496 | 7/2012 |
| DE | 112010004153 | 8/2012 |
| DE | 102012025196 | 7/2014 |
| JP | 07-284957 | 10/1995 |
| JP | 09-070675 | 3/1997 |
| JP | 11197847 | 7/1999 |
| JP | 2000-176649 | 6/2000 |
| JP | 2009160656 | 7/2009 |

\* cited by examiner

*Primary Examiner* — Mohammed Rahaman
(74) *Attorney, Agent, or Firm* — RatnerPrestia

(57) ABSTRACT

A spot welding system includes a plurality of robots each including a spot welding gun and an inspection management device for managing an electrode inspection to be executed in each of the robots, for inspecting electrodes of the spot welding gun. Each robot includes an inspection execution unit for selectively executing one of different electrode inspections. The inspection management device includes an inspection instruction unit for instructing an electrode inspection to be executed in each of the robots.

10 Claims, 11 Drawing Sheets

SPOT WELDING SYSTEM FOR MANAGING ELECTRODE INSPECTION AND ROBOT USED THEREFOR

BACKGROUND OF THE INVENTION

1. Field of the Invention

The present invention relates to a spot welding system and a robot used for the spot welding system.

2. Description of the Related Art

Execution of spot welding causes deformation or abrasion of an electrode of a welding gun, or adhesion of an oxide film to a surface of the electrode. For this reason, a polishing step (dressing) of polishing the electrode surface is carried out periodically. Dressing changes a tip position of the electrode, so that the tip position of the electrode needs to be detected again.

JP-A-2000-176649 discloses an electrode abrasion correction method for correcting an electrode abrasion amount in a spot welding gun of a robot. In the electrode abrasion correction method, an amount of electrode abrasion is calculated at the time of electrode chip replacement and during cycle operation in different manners. In JP-A-2000-176649, particularly, during cycle operation, abrasion amounts of a movable electrode and a fixed electrode are distributed according to a predetermined ratio obtained through a test in advance, so as to more accurately estimate the abrasion amounts.

However, although the technique disclosed in JP-A-2000-176649 reduces the time necessary to calculate the electrode abrasion amounts, the advantageous effect is limited to a single robot. In a spot welding step, a plurality of robots often work to process a single workpiece, and it is necessary to manage the working time of each robot. For example, when a plurality of robots execute different kinds of electrode inspections, some of the robots that execute a short-time electrode inspection need to be on standby since they cannot proceed to the next step until the other robots complete electrode inspection, which may cause reduction of overall work efficiency. In addition, in the technique of JP-A-2000-176649, accurate detection of electrode abrasion amounts cannot be executed during cycle operation, so that accuracy of the positioning of the electrode can be reduced.

Thus, there has been a need for a spot welding system capable of efficiently managing electrode inspections executed in a plurality of robots.

SUMMARY OF THE INVENTION

According to a first aspect of the present invention, a spot welding system comprising: a plurality of robots, each including a spot welding gun; and an inspection management device for managing an electrode inspection for inspecting electrodes of the spot welding gun, the electrode inspection being executed in each of the robots, wherein each of the robots comprises an inspection execution unit for selectively executing one of different kinds of electrode inspections; and the inspection management device comprises an inspection instruction unit for instructing an electrode inspection to be executed in each of the robots, is provided.

According to a second aspect of the invention, in the spot welding system of the first aspect, each of the robots further comprises a notification unit for notifying the inspection management device of a candidate of the electrode inspection to be executed in each of the robots.

According to a third aspect of the invention, in the spot welding system of the second aspect, the inspection instruction unit of the inspection management device is configured to instruct the electrode inspection to be executed in each of the robots based on the electrode inspection candidate notified by the notification unit of each of the robots.

According to a fourth aspect of the invention, in the spot welding system of the second or third aspect, each of the robots further comprises an inspection selection unit for selecting the electrode inspection candidate.

According to a fifth aspect of the invention, in the spot welding system of the fourth aspect, the inspection selection unit is configured to select the electrode inspection candidate based on at least one of a number of welding points, a number of times of electrode polishing, and position change amounts of the electrodes.

According to a sixth aspect of the invention, in the spot welding system of the third aspect, the inspection instruction unit of the inspection management device is configured, in the case where a predetermined electrode inspection is notified as the electrode inspection candidate by at least one of the robots, to instruct robots including the at least one robot that has notified the predetermined electrode inspection as the electrode inspection candidate, to execute the predetermined electrode inspection.

According to a seventh aspect of the invention, in the spot welding system of the third aspect, the inspection instruction unit of the inspection management device is configured, in the case where a predetermined electrode inspection is notified as the electrode inspection candidate by more than a predetermined number of robots or by a number of robots with respect to a total number of the robots exceeding a predetermined ratio, to instruct robots including at least the robots that have notified the predetermined electrode inspection as the electrode inspection candidate, to execute the predetermined electrode inspection.

According to an eighth aspect of the invention, in the spot welding system of the third aspect, the inspection instruction unit of the inspection management device is configured to determine an electrode inspection being notified most as the electrode inspection candidate by the robots, and instruct robots including at least the robots that have notified the electrode inspection being determined as the electrode inspection candidate, to execute the electrode inspection.

According to a ninth aspect of the invention, in the spot welding system of the third aspect, the inspection instruction unit of the inspection management device is configured to instruct execution of an electrode inspection notified as the electrode inspection candidate by a predetermined robot among the robots, to robots including at least the predetermined robot.

According to a tenth aspect of the invention, in the spot welding system of any of the first to the ninth aspects, the spot welding gun comprises a movable electrode driven by a servo motor and an opposite electrode arranged opposite to the movable electrode, the movable electrode being configured to move closer to or away from the opposite electrode, and the inspection execution unit of each of the robots is configured to be able to execute an electrode inspection for detecting a position change amount relative to an electrode position of each of the movable electrode and the opposite electrode at a reference time.

According to an eleventh aspect of the invention, in the spot welding system of the tenth aspect, the inspection execution unit of each of the robots comprises: a first acquisition unit for acquiring a first position of the movable electrode when the movable electrode and the opposite electrode of the spot welding gun contact with each other at the reference time; a second acquisition unit for acquiring a second position of the movable electrode when the movable electrode and the opposite electrode of the spot welding gun contact with each other at an inspection time; a difference calculation unit for calculating a difference between the first position and the second position of the movable electrode; and a position change amount calculation unit for distributing the difference to the movable electrode and the opposite electrode according to a predetermined ratio, so as to calculate position change amounts of the movable electrode and the opposite electrode relative to positions of the electrodes at the reference time.

According to a twelfth aspect of the invention, in the spot welding system of the tenth or eleventh aspect, the inspection execution unit of each of the robots comprises: a first acquisition unit for acquiring a first position of the movable electrode when the movable electrode and the opposite electrode of the spot welding gun contact with each other at the reference time; a second acquisition unit for acquiring a second position of the movable electrode when the movable electrode and the opposite electrode of the spot welding gun contact with each other at the inspection time; a first difference calculation unit for calculating a first difference between the first position and the second position of the movable electrode; a third acquisition unit for acquiring a third position of the movable electrode when the movable electrode of the spot welding gun is brought into contact with a jig provided at a predetermined position at the reference time; a fourth acquisition unit for acquiring a fourth position of the movable electrode when the movable electrode of the spot welding gun is brought into contact with the jig provided at the predetermined position at the inspection time; a second difference calculation unit for calculating a second difference between the third position and the fourth position of the movable electrode; and a position change amount calculation unit for calculating position change amounts of the movable electrode and the opposite electrode relative to positions of the electrodes at the reference time, based on the first difference and the second difference.

According to a thirteenth aspect of the invention, in the spot welding system of any of the tenth to twelfth aspects, the inspection execution unit of each of the robots comprises: a first image acquisition unit for acquiring images of the movable electrode and the opposite electrode of the spot welding gun at the reference time, a first electrode position detection unit for detecting a first electrode position of each of the movable electrode and the opposite electrode at the reference time, based on the images acquired by the first image acquisition unit; a second image acquisition unit for acquiring images of the movable electrode and the opposite electrode of the spot welding gun at the inspection time; a second electrode position detection unit for detecting a second electrode position of each of the movable electrode and the opposite electrode at the inspection time, based on the images acquired by the second image acquisition unit; and a position change amount calculation unit for calculating position change amounts of the movable electrode and the opposite electrode relative to positions of the electrodes at the reference time, based on the first electrode position and the second electrode position.

According to a fourteenth aspect of the invention, in the spot welding system of the thirteenth aspect, the first electrode position detection unit and the second electrode position detection unit are configured to detect a distance between a tip and a base of each of the movable electrode and the opposite electrode, respectively, by image processing.

According to a fifteenth aspect of the invention, a robot used in the spot welding system of any of the first to fourteenth aspects, is provided.

These and other objects, features and advantages of the present invention will become more apparent in light of the detailed description of exemplary embodiments thereof as illustrated by the drawings.

DETAILED DESCRIPTION OF THE INVENTION

Figure 1:
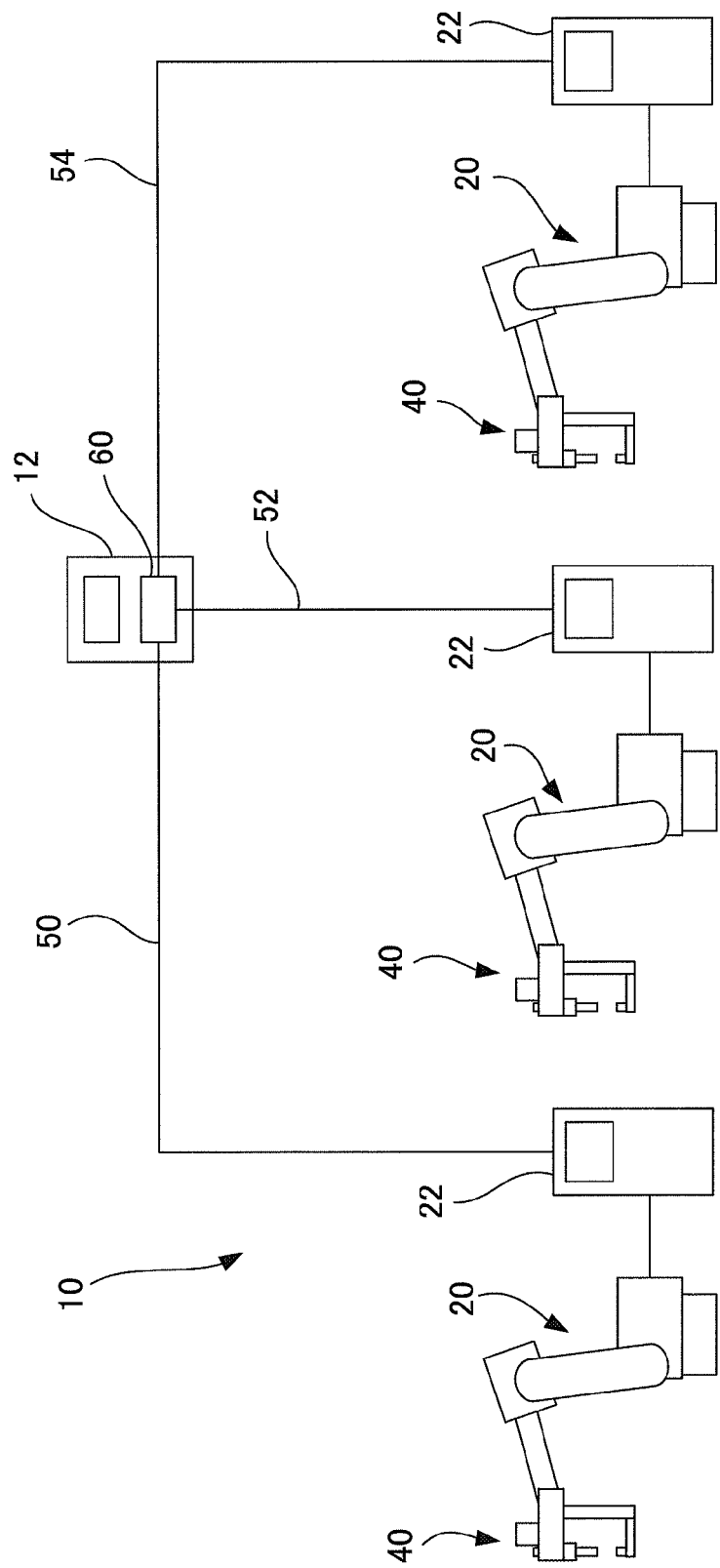
FIG. 1 is a schematic diagram depicting a spot welding system according to one embodiment of the present invention.

Exemplary embodiments of the present invention will be described below with reference to the accompanying drawings. For better understanding of the invention, constituent elements of the embodiments depicted in the drawings vary in scale as needed.

FIG. 1 is a schematic diagram depicting a spot welding system 10 according to one embodiment of the present invention. The spot welding system 10 includes a plurality of robots 20 for performing spot welding, control devices 22 for controlling the respective robots 20, and a line control panel 12 for controlling the spot welding system 10 as a whole.

Figure 2:
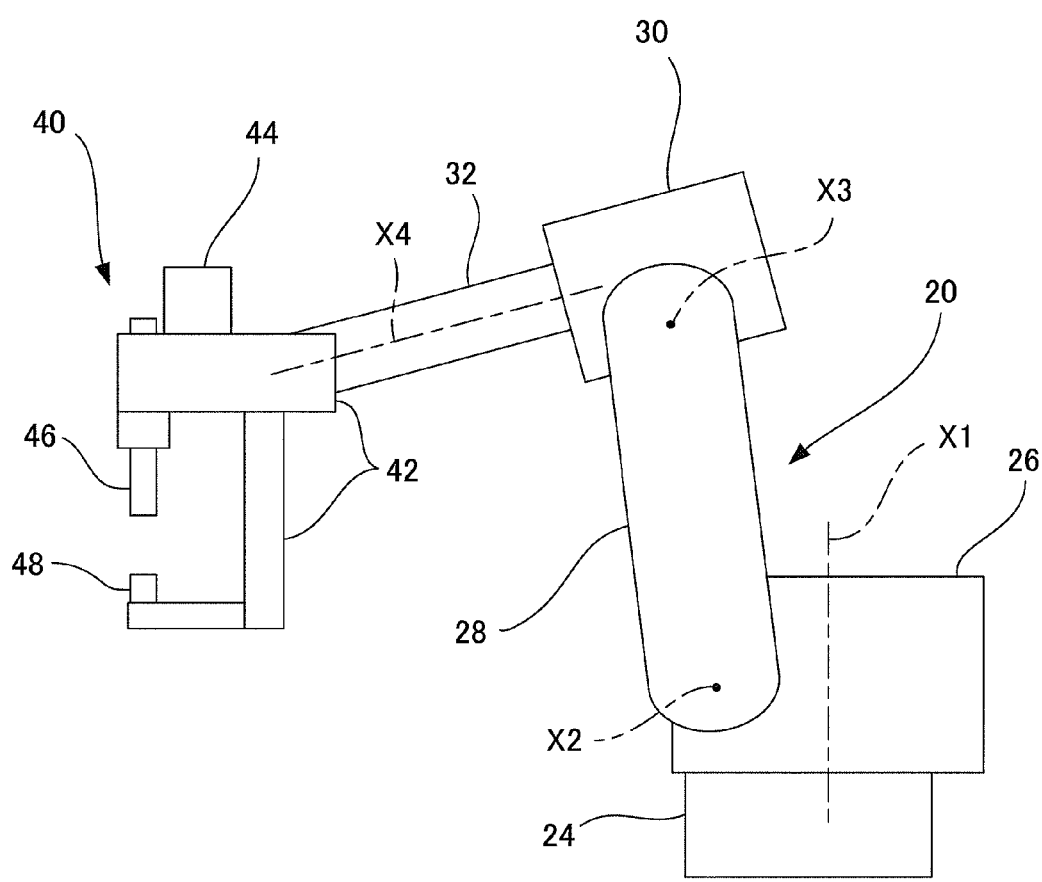
FIG. 2 is a schematic diagram depicting an exemplary robot used in the spot welding system.

FIG. 2 is a schematic diagram depicting an exemplary robot 20 used in the spot welding system 10. The robot 20 is a common multi-joint robot. For example, the robot 20 includes a base 24 fixed to a floor, a rotary barrel 26 attached to the base 24 so as to be rotatable around an axial line X1 extending in a vertical direction, a lower arm 28 attached to the rotary barrel 26 at one end of the lower arm 28 so as to be rotatable around an axial line X2, an upper arm 30 attached to the other end of the lower arm 28 so as to be rotatable around an axial line X3, a wrist element 32 attached to the upper arm 30 so as to be rotatable around an axial line X4 perpendicular to the axial line X3, and a spot welding gun 40 attached to the wrist element 32. A position and a posture of the robot 20 are controlled by the control device 22 so that the robot 20 can perform spot welding on a workpiece, which is not shown.

The spot welding gun 40 includes a gun arm 42 attached to the wrist element 32, a movable electrode 46 driven by a servo motor 44, and an opposite electrode 48 arranged opposite to the movable electrode 46. The movable electrode 46 is driven to move closer to or away from the opposite electrode 48 by the servo motor 44.

When performing spot welding, voltage is applied between the movable electrode 46 and the opposite electrode 48 in a state in which the workpiece, which is not shown, is held between the electrodes. In the illustrated spot welding gun 40, the opposite electrode 48 is fixed to the gun arm 42. The opposite electrode 48 may, however, be configured to be driven by an additional servo motor.

In addition, the robot usable in the present invention is not limited to the example illustrated in the drawings and described in the present specification. Rather, any type of multi-joint robot configured to allow the spot welding gun 40 to be moved relative to the workpiece, which is not shown, may be used.

For example, although not shown in the drawings, there may also be used a multi-joint robot provided with a hand capable of holding a workpiece at a tip thereof. In this case, the position and the posture of the robot are controlled so that the workpiece is moved relative to the spot welding gun fixed at a predetermined position to execute spot welding.

The control device 22 controls the position and the posture of the robot 20, and therefore a position and a posture of the spot welding gun 40. The control device 22 depicted in the drawings incorporates a spot welding controller for controlling the spot welding gun 40. However, the spot welding gun 40 may be controlled by a spot welding controller independently of the control device 22.

The spot welding controller is connected to an inspection management device 60 provided on the line control panel 12 via communication means 50, 52, and 54. The communication means are field buses such as DeviceNet or CC-LINK. Alternatively, the communication means may have any configuration capable of switching ON/OFF of a signal transmitted and received between the spot welding controller and the line control panel 12 connected to each other via a terminal provided for each type of signal. The inspection management device 60 has a function of managing inspection of states of the electrodes to be executed in each robot 20. Details of the electrode inspection will be described below.

Figure 3:
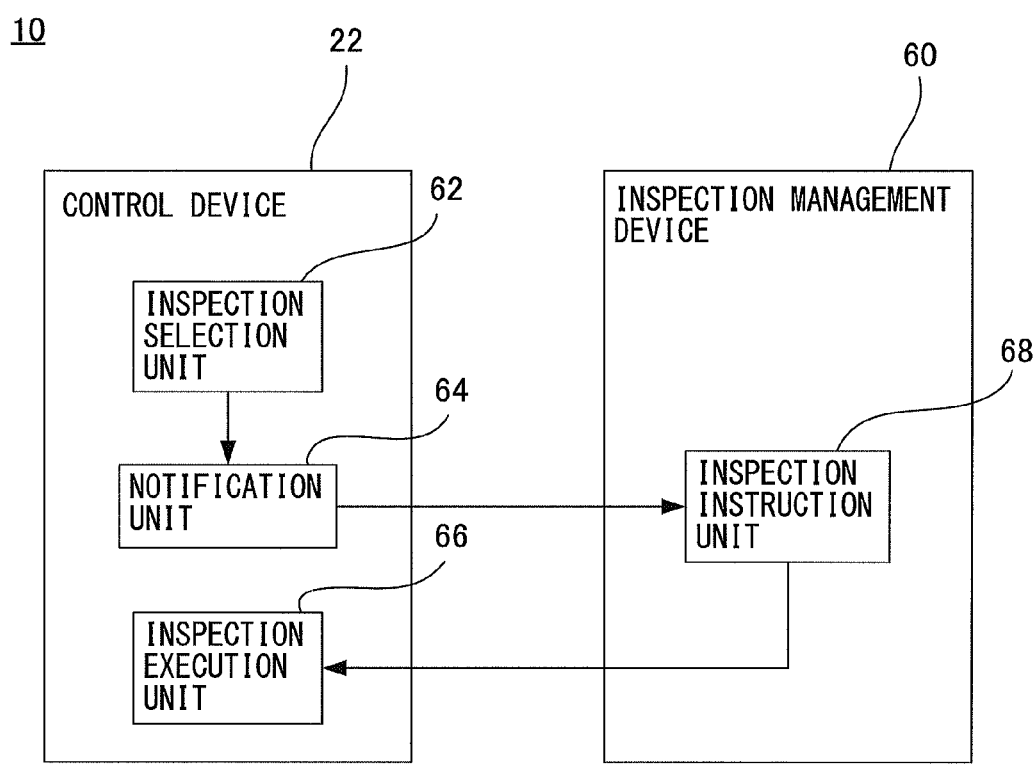
FIG. 3 is a functional block diagram of the spot welding system according to one embodiment of the invention.

FIG. 3 is a functional block diagram of the spot welding system 10 according to one embodiment of the present invention. In FIG. 3, for simplification of description, only functional blocks of the control device 22 of one of the robots 20 are shown. As depicted in the drawing, the control device 22 includes an inspection selection unit 22, a notification unit 64, and an inspection execution unit 66.

The inspection execution unit 66 has a function of selectively executing an electrode inspection of a plurality of kinds of electrode inspections in the robot 20. The electrode inspections that can be executed by the inspection execution unit 66 include, for example, a step of detecting abrasion amounts of the electrodes, a step of detecting mounting angles of the electrodes, a step of measuring diameters of electrode tips, and any combination thereof, but are not limited thereto. In other words, the electrode inspections executed by the inspection execution unit 66 may include any type of electrode inspection necessary to be executed in the robot 20.

The inspection selection unit 62 has a function of autonomously selecting an electrode inspection candidate to be executed in the robot 20. It is not particularly limited how the inspection selection unit 62 selects the electrode inspection candidate. For example, the inspection selection unit 62 is configured to select an electrode inspection candidate based on the number of points of welding executed by the spot welding gun 40, the number of times of dressing, or position change amounts (amounts of electrode abrasion) of the electrodes. Alternatively, the inspection selection unit 62 may be configured to select an electrode inspection candidate in accordance with any combination of the above information. The inspection selection unit 62 may also be configured to periodically select a certain kind of electrode inspection in a predetermined manner.

The notification unit 64 has a function of notifying the inspection management device 60 of a candidate of an electrode inspection to be executed in the robot 20. In the present embodiment, an electrode inspection candidate to be notified by the notification unit 64 is selected by the inspection selection unit 62. However, in an alternative embodiment, the notification unit 64 may be configured to notify the inspection management device 60 of, for example, an electrode inspection candidate designated from outside by an operator. For example, when a certain electrode inspection is notified as a candidate, a signal associated with a predetermined number corresponding to the electrode inspection is switched ON.

As depicted in FIG. 3, the inspection management device 60 includes an inspection instruction unit 68. The inspection instruction unit 68 has a function of instructing an electrode inspection to be executed in each robot 20. For example, the inspection instruction unit 68 is configured to determine an electrode inspection to be executed in each robot 20 based on an electrode inspection candidate notified by the notification unit 64 of the control device 22. However, in an alternative embodiment, the inspection instruction unit 68 may be configured to instruct each robot 20, for example, to execute an electrode inspection designated from outside by an operator.

The inspection instruction unit 68 may be configured to instruct each robot 20 to execute an electrode inspection according to a sequence incorporated in the line control panel 12. For example, the line control panel 12 may incorporate a sequence for instructing to switch the kinds of electrode inspection according to the number of times of running each of various programs, such as a spot welding work program or an electrode inspection program. For example, when a certain electrode inspection is instructed, a signal associated with a predetermined number corresponding to the electrode inspection is switched ON.

The inspection execution unit 66 executes an electrode inspection in the robot 20 related to the inspection execution unit 66 according to an instruction from the inspection instruction unit 68 of the inspection management device 60.

Figure 4:
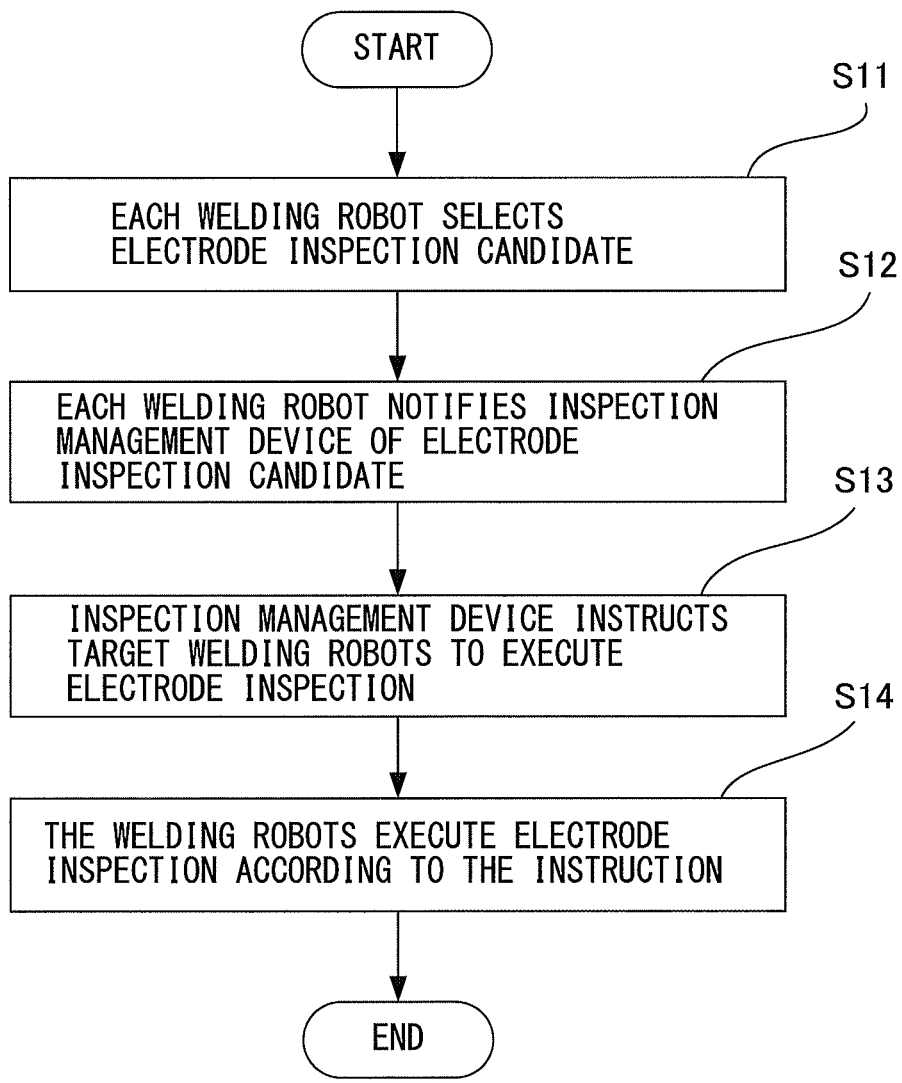
FIG. 4 is a flowchart depicting a processing flow of electrode inspection executed by the spot welding system according to one embodiment of the invention.

FIG. 4 is a flowchart depicting a processing flow of an electrode inspection executed by the spot welding system 10 according to one embodiment of the present invention. The electrode inspection is generally executed immediately after dressing or after electrode replacement. Electrode inspection may be executed in either all or only some of the robots 20 of the spot welding system 10.

In the present embodiment, in order to execute an electrode inspection in the robots 20, the inspection selection unit 62 is activated to select an electrode inspection candidate to be executed in each of the robot 20 which are the subject of the electrode inspection (step S11).

The electrode inspection candidate selected in each robot 20 at step S11 is input to the inspection management device 60 by the notification unit 64 (step S12).

The inspection management device 60 determines an electrode inspection to be executed in each robot 20 based on the electrode inspection candidate selected in each robot 20. The inspection instruction unit 68 of the inspection management device 60 instructs the inspection execution unit 66 of each robot 20 to execute the electrode inspection determined in this way (step S13).

The inspection execution unit 66 executes the electrode inspection in the robot 20 related thereto, according to the instruction from the inspection management device 60 (step S14).

Accordingly, in the present embodiment, an electrode inspection to be executed in each robot is instructed by the inspection management device. This ensures that the same electrode inspection is executed in a plurality of robots, which can thereby prevent some of the robots from having a standby time due to a difference in times necessary to complete electrode inspection. Thus, operation efficiency of the overall line is improved. In an alternative embodiment, when each robot 20 is instructed to execute electrode inspection according to a sequence incorporated in the line control panel 12, steps S11 and S12 may be omitted.

In addition, in the present embodiment, since each robot can autonomously select an electrode inspection candidate, appropriate electrode inspection candidates are selected, depending on the state of each robot.

Further, an electrode inspection candidate selected in each robot can be notified to the inspection management device with the aid of the notification unit associated with the robots.

Furthermore, since the inspection management device instructs each robot to execute electrode inspection based on an electrode inspection candidate selected in each robot, an appropriate electrode inspection in accordance with the state of each robot is executed.

Examples of electrode inspection executed in each robot 20 will be described with reference to FIGS. 5 to 12. The following will describe examples in which position change amounts of a pair of electrodes (the movable electrode 46 and the opposite electrode 48) are calculated in order to detect amounts of abrasion of the electrodes. However, it is to be noted that electrode inspection that can be executed in each robot 20 is not limited to the specific examples below.

(1) First Electrode Inspection

Figure 5:
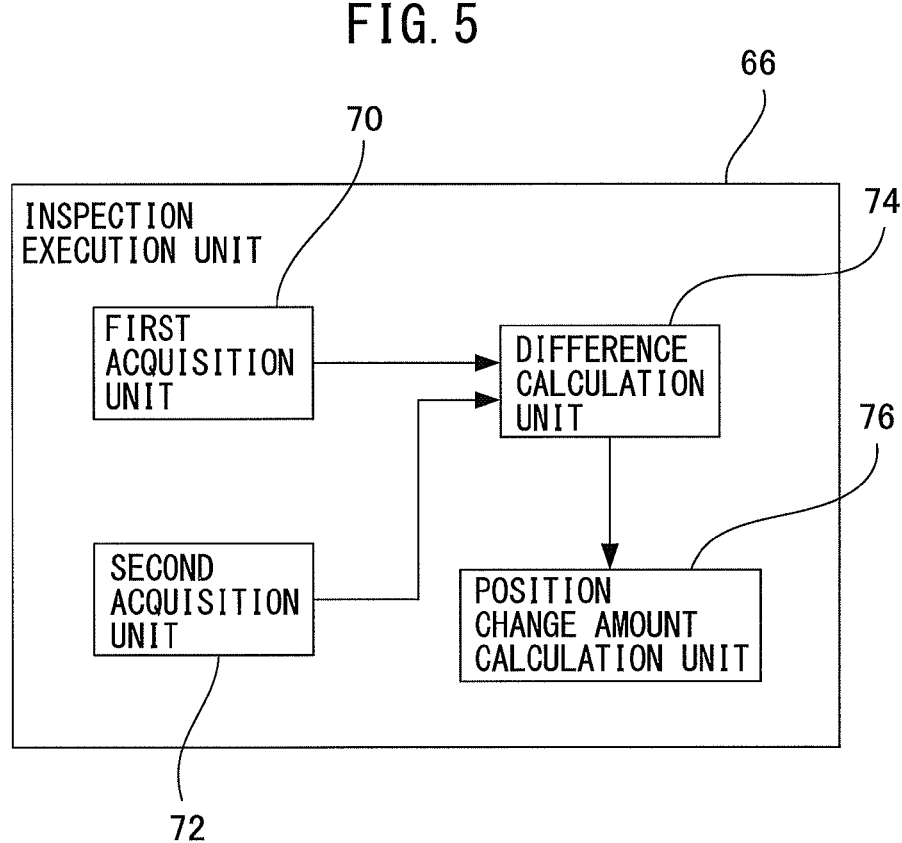
FIG. 5 is a functional block diagram of an inspection execution unit for executing a first electrode inspection.

FIG. 5 is a functional block diagram of the inspection execution unit 66 that executes a first electrode inspection. The inspection execution unit 66 includes a first acquisition unit 70, a second acquisition unit 72, a difference calculation unit 74, and a position change amount calculation unit 76. The first electrode inspection is executed in order to calculate position change amounts of tips of the movable electrode 46 and the opposite electrode 48, respectively, based on tip positions of the movable electrode 46 and the opposite electrode 48 at a reference time, for example, before the movable electrode 46 and the opposite electrode 48 are used at all, and at an inspection time, for example, immediately after performing dressing or immediately after electrode replacement.

Figure 6:
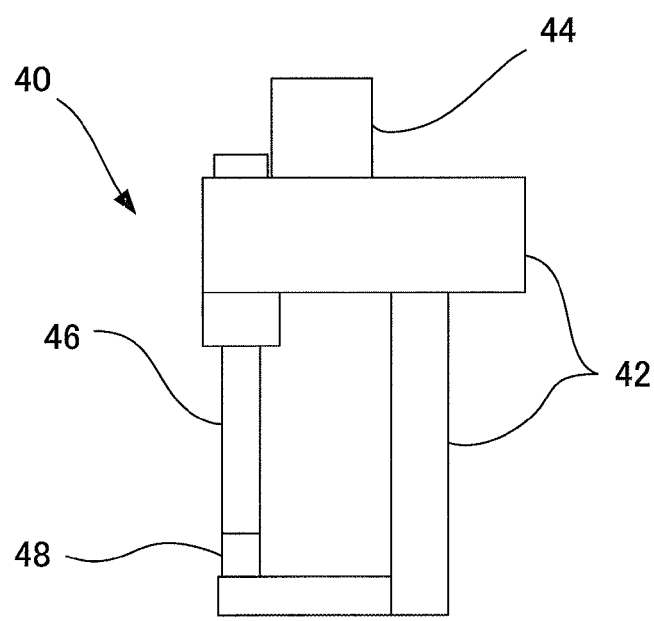
FIG. 6 is an enlarged view of a spot welding gun enlarged in order to illustrate the first electrode inspection.

The first acquisition unit 70 acquires a position of the movable electrode 46 (first position) when the movable electrode 46 and the opposite electrode 48 of the spot welding gun 40 contact with each other at a reference time. As depicted in FIG. 6, the servo motor 44 is driven to move the movable electrode 46 until it contacts with the opposite electrode 48. Then, a rotation position of the servo motor 44 at that time is detected by a position detection means, such as an encoder, which is not shown, thereby acquiring the position of the movable electrode 46.

The second acquisition unit 72 acquires a position of the movable electrode 46 (second position) when the movable electrode 46 and the opposite electrode 48 of the spot welding gun 40 contact with each other at an inspection time (see FIG. 6), in the same manner as the first acquisition unit 70. The difference calculation unit 74 outputs information on the first and second positions of the movable electrode 46 acquired by the first and the second acquisition units 70 and 72.

The difference calculation unit 74 calculates a difference between the first position and the second position of the movable electrode 46. The difference between the position of the movable electrode at the reference time and the position of the movable electrode 46 at the inspection time corresponds to a total amount of abrasion of the movable electrode 46 and the opposite electrode 48 during a period of time from the reference time to the inspection time.

The position change amount calculation unit 76 distributes the difference calculated by the difference calculation unit 74 to the movable electrode 46 and the opposite electrode 48 according to a predetermined ratio to calculate a position change amount of the tip position of each of the electrodes 46 and 48 relative to the corresponding tip position at the reference time. The ratio for distributing the difference may be predetermined, for example, through a test.

Figure 7:
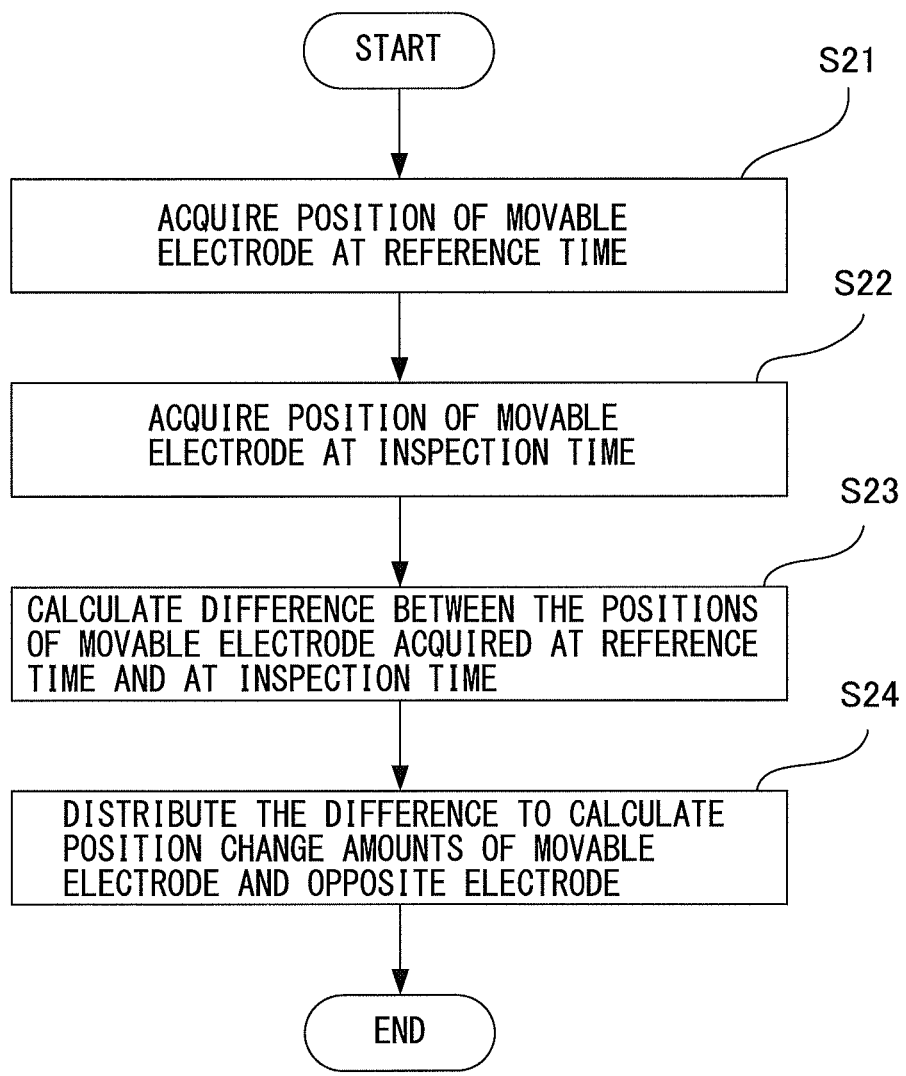
FIG. 7 is a flowchart depicting a processing flow of the first electrode inspection.

FIG. 7 is a flowchart depicting a processing flow of the first electrode inspection. As described above, in the first electrode inspection, the position of the movable electrode 46 when the movable electrode 46 and the opposite electrode 48 contact with each other at a reference time is acquired by the first acquisition unit 70 (step S21). The position of the movable electrode 46 at the reference time is stored, for example, in the control device 22.

Then, in order to execute the electrode inspection, the movable electrode 46 is again brought into contact with the opposite electrode 48 to acquire the position of the movable electrode 46 at that time by the second acquisition unit 72 (step S22).

Next, the difference calculation unit 74 of the inspection execution unit 66 calculates a difference between the position of the movable electrode 46 at the reference time and the position thereof at the inspection time, which have been acquired at steps S21 and S22 (step S23).

The position change amount calculation unit 76 distributes the difference between the positions of the movable electrode 46 calculated at step S23 according to a predetermined ratio to calculate a position change amount of each of the movable electrode 46 and the opposite electrode 48 (step S24). The position change amount of each electrode calculated at step S24 corresponds to an abrasion amount of the tip of each of the movable electrode 46 and the opposite electrode 48.

In the first electrode inspection, the amounts of abrasion of the movable electrode 46 and the opposite electrode 48 can be obtained merely by calculation after contacting the movable electrode 46 with the opposite electrode 48 at the inspection time to detect the position of the movable electrode 46 at that time. Thus, the electrode inspection can be executed in a relatively short time.

(2) Second Electrode Inspection

Figure 8:
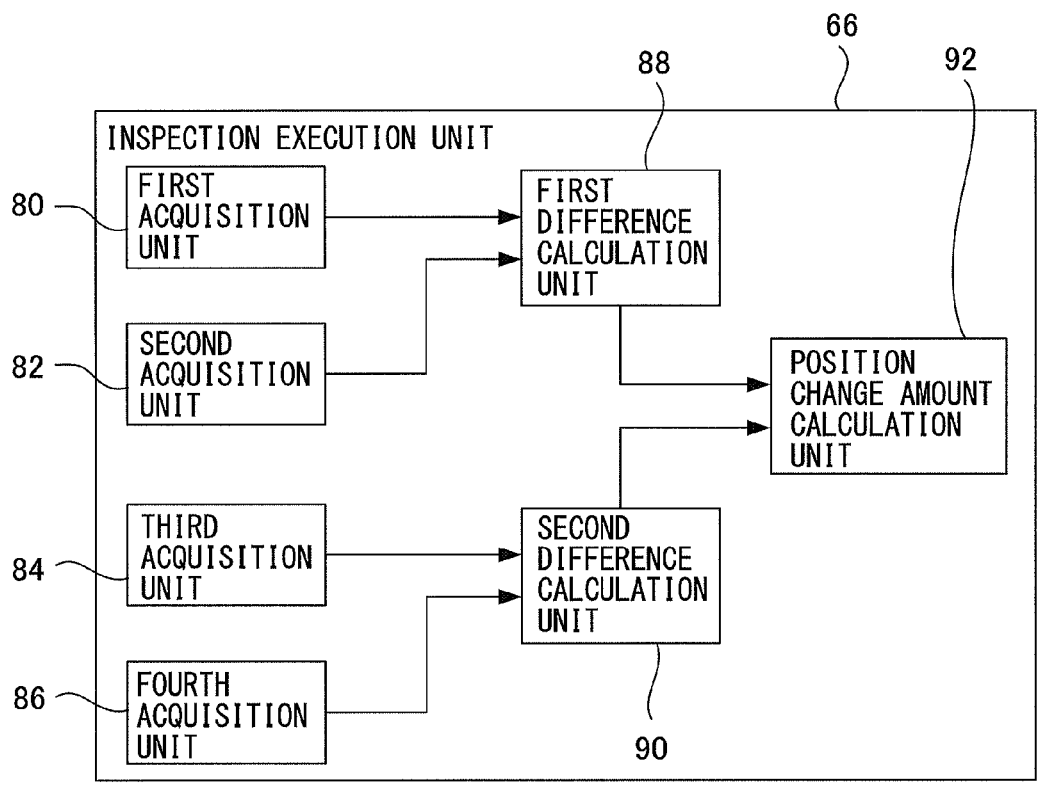
FIG. 8 is a functional block diagram of an inspection execution unit for executing a second electrode inspection.

FIG. 8 is a functional block diagram of the inspection execution unit 66 that executes a second electrode inspection. The inspection execution unit 66 includes a first acquisition unit 80, a second acquisition unit 82, a third acquisition unit 84, a fourth acquisition unit 86, a first difference calculation unit 88, a second difference calculation unit 90, and a position change amount calculation unit 92. The second electrode inspection determines position change amounts, i.e., abrasion amounts of the movable electrode 46 and the opposite electrode 48 by acquiring positions of the movable electrode 46 at a reference time and at an inspection time, as in the first electrode inspection.

The first acquisition unit 80 acquires a position of the movable electrode 46 (first position) when the movable electrode 46 and the opposite electrode 48 of the spot welding gun 40 contact with each other at the reference time. The second acquisition unit acquires a position of the movable electrode 46 (second position) when the movable electrode 46 and the opposite electrode 48 of the spot welding gun 40 contact with each other at the inspection time. The first difference calculation unit 88 calculates a difference (first difference) between the positions of the movable electrode 46 acquired at the reference time and at the inspection time. Accordingly, the first acquisition unit 80, the second acquisition unit 82, and the first difference calculation unit 88 have the same functions as those of the first acquisition unit 70, the second acquisition unit 72, and the difference calculation unit 74 described in relation to the first electrode inspection.

Figure 9:
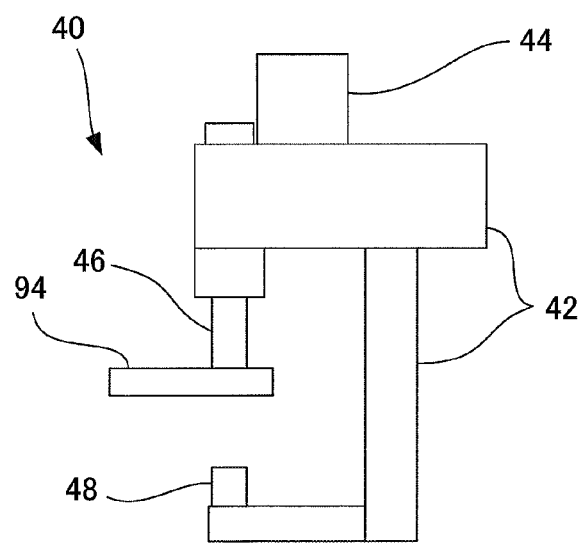
FIG. 9 is an enlarged view of a spot welding gun enlarged in order to illustrate the second electrode inspection.

The third acquisition unit 84 acquires a position of the movable electrode 46 (third position) when the movable electrode 46 of the spot welding gun 40 is brought into contact with a jig 94 at the reference time. FIG. 9 depicts an example of a state in which the movable electrode 46 is in contact with the jig 94. The jig 94 is, for example, a plate member having a smooth surface and is fixed at a predetermined position.

In the case where the robot 20 is provided with the spot welding gun 40 at an arm tip thereof, the spot welding gun 40 is moved near the jig 94 fixed at the predetermined position and then the movable electrode 46 is moved to contact with the jig 94. On the other hand, in the case where the spot welding gun 40 is fixed at a predetermined position, the jig 94 is moved to a position between the movable electrode 46 and the counter elector 48 by a power applying means such as an air cylinder. Next, the movable electrode 46 is moved to contact with the jig 94.

The fourth acquisition unit 86 acquires a position of the movable electrode 46 (fourth position) when the movable electrode 46 of the spot welding gun 40 is brought into contact with the jig 94 at the inspection time. The jig 94 used at that time is the same member as that used when the position of the movable electrode 46 has been acquired by the third acquisition unit 84 and is fixed at the same position as in that time. Procedures for bringing the movable electrode 46 into contact with the jig 94 are the same as those described in relation with the third acquisition unit 84.

The second difference calculation unit 90 calculates, based on the third position of the movable electrode 46 acquired by the third acquisition unit 84 and the fourth position thereof acquired by the fourth acquisition unit 86, a difference (second difference) between those positions of the movable electrode 46. The difference calculated by the second difference calculation unit 90 corresponds to an amount of change of the tip position of the movable electrode 46 at the inspection time relative to the tip position thereof at the reference time. Accordingly, calculating the second difference allows determination of an amount of abrasion of the movable electrode 46.

The position change amount calculation unit 92 calculates amounts of changes of the tip positions of the movable electrode 46 and the opposite electrode 48 relative to those at the reference time, based on the first difference calculated by the first difference calculation unit 88 and the second difference calculated by the second difference calculating unit 90. In other words, as described above, the first difference represents the total amount of abrasion amounts of the movable electrode 46 and the opposite electrode 48, whereas the second difference represents the amount of abrasion of the movable electrode 46 only. Accordingly, an amount of abrasion (position change amount) of the opposite electrode 48 can be obtained by subtracting the second difference from the first difference.

Figure 10:
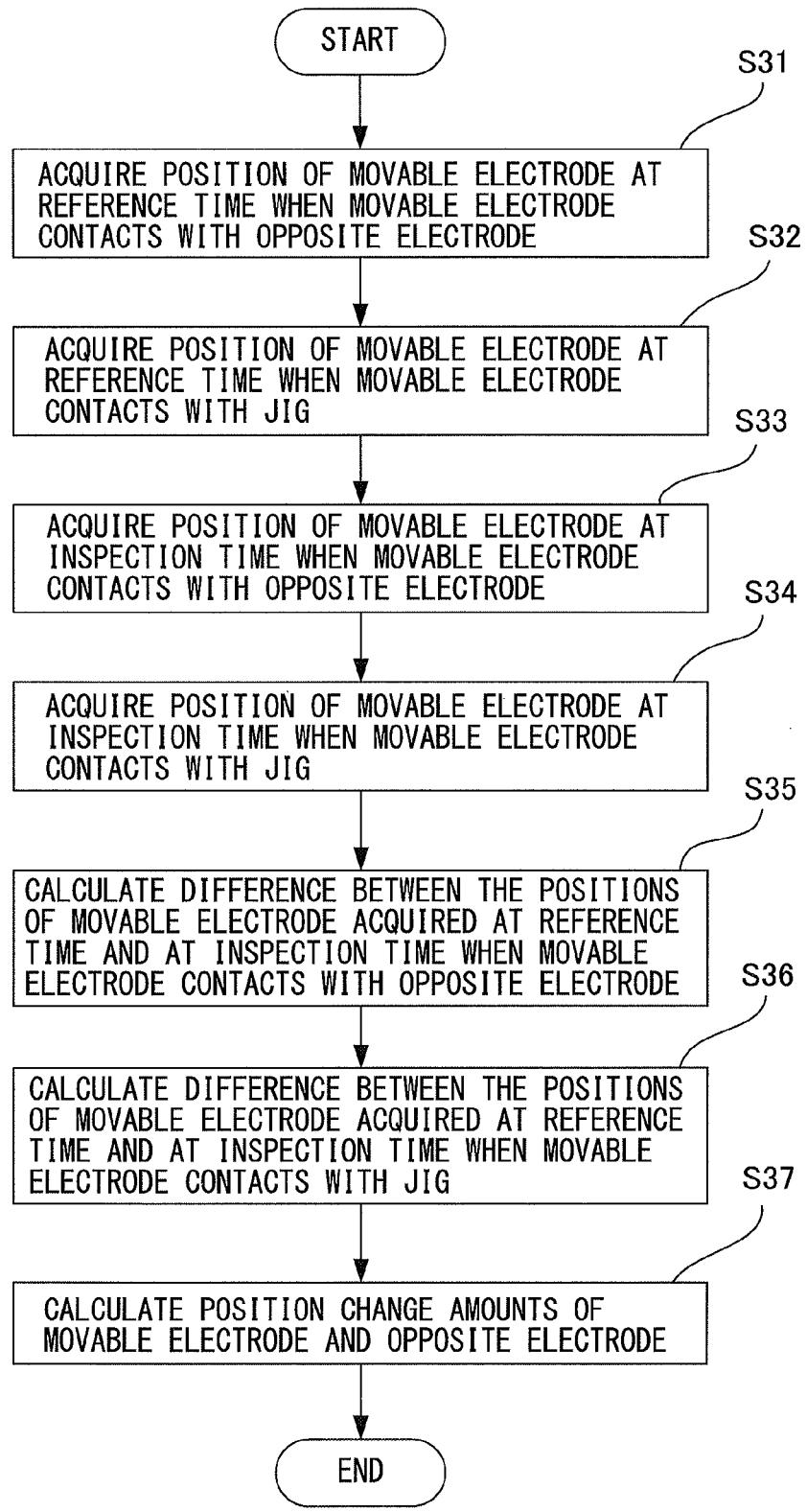
FIG. 10 is a flowchart depicting a processing flow of the second electrode inspection.

FIG. 10 is a flowchart depicting a processing flow of the second electrode inspection. In the second electrode inspection, two positions of the movable electrode 46 are acquired at the reference time (steps S31 and S32). In other words, at step S31, the first acquisition unit 80 acquires the position of the movable electrode 46 in contact with the opposite electrode 48 (see FIG. 6). At step S32, the third acquisition unit 84 acquires the position of the movable electrode 46 in contact with the jig 94 (see FIG. 9). The positions of the movable electrode 46 acquired at steps S31 and S32 are stored, for example, in the control device 22.

Similarly, at the inspection time, two positions of the movable electrode 46 are acquired (steps S33 and S34). In other words, at step S33, the second acquisition unit 82 acquires the position of the movable electrode 46 in contact with the opposite electrode 48 (see FIG. 6). In addition, at step S34, the fourth acquisition unit 86 acquires the position of the movable electrode 46 in contact with the jig 94 (see FIG. 9).

Next, the first difference calculation unit 88 calculates a difference (first difference) between the positions of the movable electrode 46 at the reference time and at the inspection time acquired at steps S31 and S33 (step S35). Furthermore, the second difference calculation unit 90 calculates a difference (second difference) between the positions of the movable electrode 46 at the reference time and at the inspection time acquired at steps S32 and S34 (step S36).

Finally, the position change amount calculation unit 92 calculates position change amounts of the movable electrode 46 and the opposite electrode 48 (step S37).

In the second electrode inspection as described above, the movable electrode 46 is brought into contact with the jig 94, which requires an additional step of acquiring the position of the movable electrode 46 at that time. This increases the time necessary for the inspection as compared to the first electrode inspection. On the other hand, the second electrode inspection is advantageous in that the position change amounts of the movable electrode 46 and the opposite electrode 48 can be more accurately measured.

(3) Third Electrode Inspection

Figure 11:
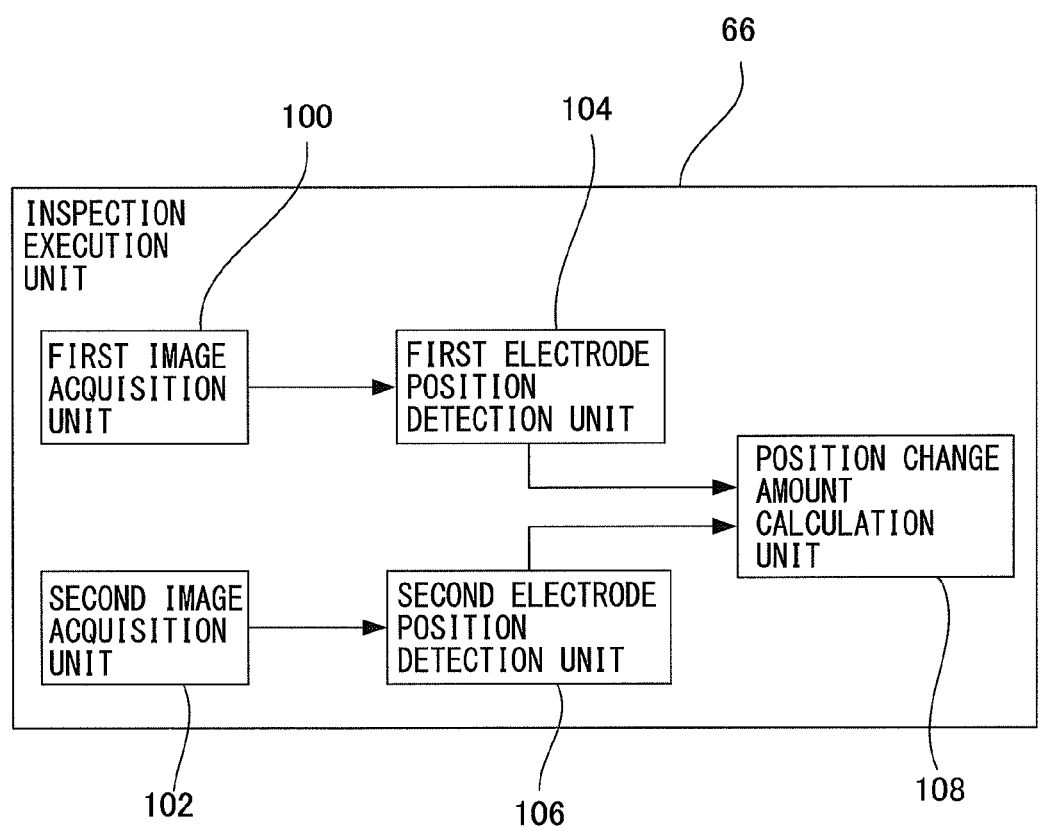
FIG. 11 is a functional block diagram of an inspection execution unit for executing a third electrode inspection.

FIG. 11 is a functional block diagram of the inspection execution unit 66 that executes a third electrode inspection. The inspection execution unit 66 includes a first image acquisition unit 100, a second image acquisition unit 102, a first electrode position detection unit 104, a second electrode position detection unit 106, and a position change amount calculation unit 108.

The first image acquisition unit 100 and the second image acquisition unit 102 acquire images of the movable electrode 46 and the opposite electrode 48, respectively, using a known image pickup element, such as a CCD or CMOS. The first image acquisition unit 100 acquires images of the movable electrode 46 and the opposite electrode 48 at a reference time, and the second image acquisition unit 102 acquires images of the movable electrode 46 and the opposite electrode 48 at an inspection time.

For example, an image acquisition means such as a camera controlled by the first image acquisition unit 100 or the second image acquisition unit 102 is fixed at a predetermined position, and the spot welding gun 40 is attached to the arm tip of the robot 20. In that case, in order to execute an image pickup step, a position and a posture of the robot 20 are controlled to move the spot welding gun 40 to a position in which images of the movable electrode 46 and the opposite electrode 48 can be captured.

In an alternative embodiment, in the case where the spot welding gun 40 is fixed at a predetermined position, the image acquisition means is fixed at a predetermined position at which images of the movable electrode 46 and the opposite electrode 48 can be captured.

Alternatively, the image acquisition means may be attached to the arm tip of the robot 20 so that the image acquisition means can be moved to a position at which images of the movable electrode 46 and the opposite electrode 48 can be captured.

The first electrode position detection unit 104 processes an image acquired by the first image acquisition unit 100 to specify positions of a base and a tip of each electrode and also detect a distance between the base and the tip thereof, i.e., a length of each electrode. In this way, the first electrode position detection unit 104 detects positions of the movable electrode 46 and the opposite electrode 48 (for example, tip positions of the electrodes) at the time of reference. The second electrode position detection unit 106 functions similarly to the first electrode position detection unit 104 to detect positions of the movable electrode 46 and the opposite electrode 48 at the inspection time.

Figure 12:
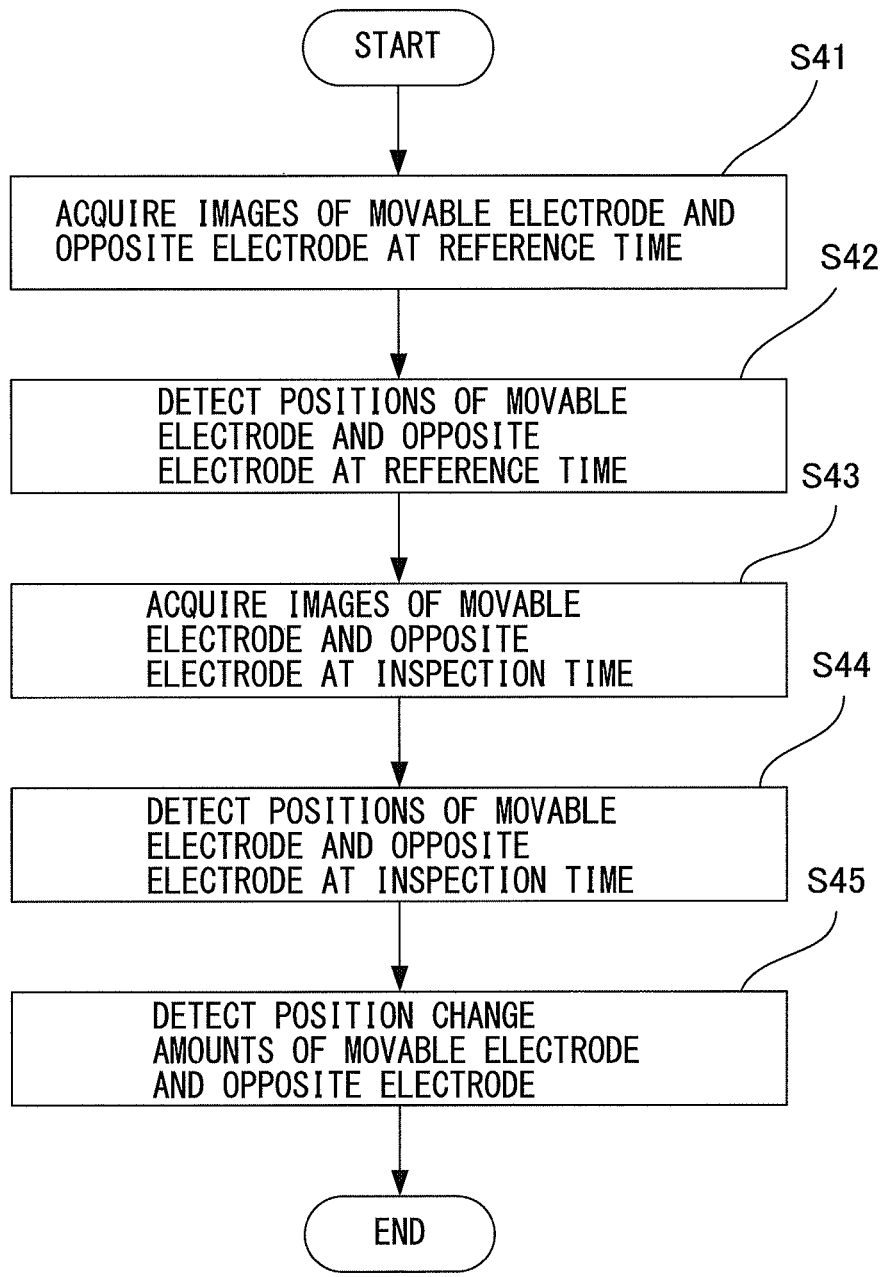
FIG. 12 is a flowchart depicting a processing flow of the third electrode inspection.

FIG. 12 is a flowchart depicting a processing flow of the third electrode inspection. In the third electrode inspection, the first image acquisition unit 100 acquires images of the movable electrode 46 and the opposite electrode 48 at the reference time (step S41), and the first electrode position detection unit 104 detects positions of the movable electrode 46 and the opposite electrode 48 (step S42). The positions of the movable electrode 46 and the opposite electrode 48 at the reference time detected at step S42 are stored, for example, in the control device 22.

Furthermore, at the inspection time, the second image acquisition unit 102 acquires again images of the movable electrode 46 and the opposite electrode 48 (step S43). Then, the second electrode position detection unit 106 detects positions of the movable electrode 46 and the opposite electrode 48 at the inspection time (step S44).

The position change amount calculation unit 108 compares the positions of the electrodes at the reference time with the positions of the electrodes at the inspection time to calculate position change amounts of the movable electrode 46 and the opposite electrode 48 (step S45).

In the third electrode inspection, the position change amounts of the electrodes are calculated based on the images of the movable electrode 46 and the opposite electrode 48, so that an accurate position change amount of each of the electrodes can be advantageously calculated.

The abrasion amounts (position change amounts) of the movable electrode 46 and the opposite electrode 48 obtained by the first to third electrode inspections are used to correct the position and the posture of each robot 20 for executing spot welding or an instructed position of the movable electrode 46. The abrasion amounts may also be used to judge whether or not electrode replacement is necessary.

As described above in relation to FIG. 3, according to one embodiment of the present invention, each robot 20 includes the inspection selection unit 62 to autonomously select a candidate of an electrode inspection to be executed. The following is a description of how the robot 20 selects the electrode inspection candidate, and the description will be given by exemplifying a selection method for selecting either one of the first and the second electrode inspections described above.

(1) First Selection Method

As described above, the first electrode inspection ends in a shorter time than the second electrode inspection. It is thus preferable to execute the first electrode inspection when priority is given to improvement in operational efficiency of a production line. On the other hand, the second electrode inspection can detect the position change amounts of the electrodes more accurately, and thus is preferably executed periodically in terms of improving precision of the spot welding step.

Accordingly, according to a first selection method, a difference between position change amounts of the electrodes detected by a latest first electrode inspection and position change amounts thereof detected by a latest second electrode inspection is calculated. Then, when the difference between the position change amounts of the electrodes is smaller than a threshold value, the inspection selection unit 62 selects the first electrode inspection as an electrode inspection candidate. On the other hand, when the difference between the position change amounts of the electrodes is equal to or more than the threshold value, the second electrode inspection is selected.

The position change amounts (abrasion amounts) of the electrodes gradually become larger each time spot welding is executed. Thus, as the first electrode inspection is repeated multiple times, the difference between the position change amounts of the electrodes is gradually increased. Thus, according to this selection method, the second electrode inspection is periodically selected while the first electrode inspection is mainly selected as the electrode inspection candidate. This allows the accurate detection of position change amounts and the improvement in operational efficiency to be realized at the same time.

(2) Second Selection Method

According to a second selection method, an electrode inspection candidate is determined based on the number of times of execution of the spot welding, i.e., the number of welding points. For example, the number of welding points is stored in a counter incorporated in the control device 22, and when the value of the counter is less than a threshold value, the first electrode inspection is selected. On the other hand, when the value of the counter is equal to or more than the threshold value, the second electrode inspection is selected. Once the second electrode inspection is actually executed, the number of welding points stored in the counter is reset to zero. In the case where an electrode inspection candidate is selected according to this selection method, the first electrode inspection is mainly selected and the second electrode inspection is periodically selected.

(3) Third Selection Method

According to a third selection method, an electrode inspection candidate is determined based on the number of times of execution of electrode polishing (dressing). Similarly to the second selection method, the number of times of dressing is stored in the counter and the value of the counter is compared with a threshold value. As a result of the comparison, either the first electrode inspection or the second electrode inspection is selected. In this way, as in the first and the second selection methods, the first electrode inspection is mainly selected, as well as the second electrode inspection is periodically selected.

Next, exemplary determination methods by the inspection instruction unit 68 for determining an electrode inspection that is to be actually executed in each robot 20, based on an electrode inspection candidate notified by the notification unit 64 of the robot 20 will be described.

(1) First Determination Method

According to a first determination method, in the case where at least one of the robots 20 included in the spot welding system 10 selects the second electrode inspection as an electrode inspection candidate (condition 1), all of the robots 20 that are subject of the electrode inspection are instructed to execute the second electrode inspection. On the other hand, when the condition 1 is not satisfied, each of the robots 20 is instructed to execute the first electrode inspection. According to this determination method, a predetermined electrode inspection (in this case, the second electrode inspection) can be preferentially executed.

(2) Second Determination Method

According to a second determination method, in the case where the second electrode inspection is notified as an electrode inspection candidate from a predetermined number of robots 20 among the robots 20 included in the spot welding system 10 (condition 2), all of the robots 20 that are subject of the electrode inspection are instructed to execute the second electrode inspection. Alternatively, each robot 20 may be instructed to execute the second electrode inspection, in the case where the second electrode inspection is notified as an electrode inspection candidate from the number of robots 20 relative to a total number of robots 20 exceeding a predetermined ratio (condition 3). Alternatively, in the case where both of conditions 2 and 3 are satisfied (condition 4), the second electrode inspection may be determined as a candidate to be executed. In the case where none of conditions 2 to 4 are satisfied, each robot 20 is instructed to execute the first electrode inspection. According to this determination method, priority of executing a certain electrode inspection (for example, the second electrode inspection) may be adjusted as necessary.

(3) Third Determination Method

According to a third determination method, the inspection instruction unit 68 is configured so as to instruct each robot 20 to execute an electrode inspection being notified most among electrode inspection candidates notified from the robots 20. This determination method allows an appropriate electrode inspection to be executed in accordance with the states of all of the robots 20 included in the spot welding system 10.

(4) Fourth Determination Method

According to a fourth determination method, a certain robot 20 is preset as a master robot, and the inspection instruction unit 68 is configured so as to instruct each robot 20 to execute an electrode inspection candidate notified by the master robot. This determination method allows an appropriate electrode inspection to be executed in accordance with the state of the particular robot.

Figure 13:
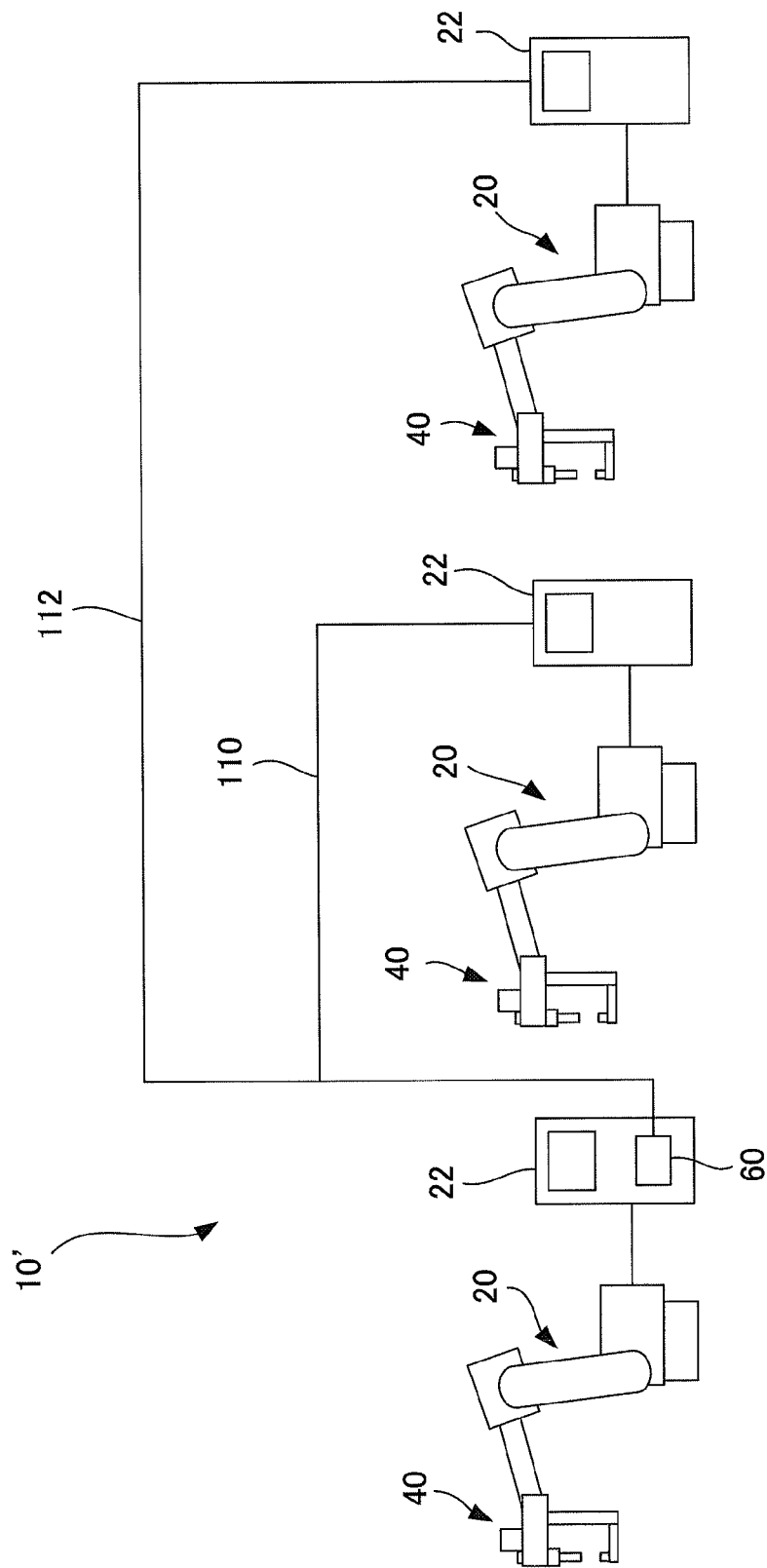
FIG. 13 is a schematic diagram depicting a spot welding system according to another embodiment of the invention.

FIG. 13 is a schematic diagram depicting a spot welding system 10' according to another embodiment of the present invention. In this embodiment, the inspection management device 60 is provided in a control device 22 for controlling a single robot 20. The other robots 20 are connected to the inspection management device 60 via communication means 110 and 112. The communication means are, for example, field buses such as DeviceNet or CC-LINK. Alternatively, the communication means may have any configuration capable of switching ON/OFF of signal transmitted and received between the spot welding controller and the line control panel 12 connected to each other via a terminal associated with each type of signal. Thus, the spot welding system 10 may have various configurations. Although FIGS. 1 and 13 depict three robots 20, those skilled in the art would recognize that two robots 20 or four or more robots 20 may be used as well.

In order to detect the position change amounts of the electrodes, an optical sensor may be used other than the methods described above. In this case, position change amounts of the electrodes are obtained by detecting electrode positions at a reference time and at an inspection time, respectively, using the optical sensor and comparing the detection results. The robots may be configured to selectively execute any combination of electrode inspections, including the first to third electrode inspections described above.

Effect of the Invention

According to the spot welding system thus configured, the plurality of robots execute an electrode inspection according to an instruction from the inspection management device. As a result, the electrode inspection executed in the robots is managed efficiently in the overall line. This system can therefore prevent work efficiency from being impaired due to a standby time that may occur when the robots execute different electrode inspections from one another, thus improving operational efficiency of the overall spot welding system.

While various embodiments and modifications of the present invention have been described hereinabove, it is apparent to those skilled in the art that functions and effects intended by the present invention may also be achieved by other embodiments and modifications. Particularly, it is possible to omit or replace the constituent elements of the above-described embodiments and modifications, and it is also possible to add a known means, without departing from the scope of the invention. In addition, it is apparent to those skilled in the art that the present invention can be embodied by any combination of features of the embodiments disclosed explicitly or implicitly in the present specification.

What is claimed is:

1. A spot welding system comprising:
   a plurality of robots, each including a spot welding gun;
   an inspection management device for managing an electrode inspection for inspecting electrodes of the spot welding gun, the electrode inspection being executed in each of the robots; and
   a notification unit for notifying the inspection management device of a candidate of the electrode inspection to be executed in each of the robots, and the notification unit being configured to notify plural kinds of electrode inspections with respect to one kind of electrode which is arranged in the spot welding gun,
   wherein each of the robots comprises an inspection execution unit for selectively executing one inspection of the plural kinds of electrode inspections with respect to said one kind of electrode which is arranged in the spot welding gun, wherein the inspection management device comprises an inspection instruction unit for instructing an electrode inspection to be executed in each of the robots, wherein the inspection instruction unit of the inspection management device is configured to instruct the electrode inspection to be executed in each of the robots based on the electrode inspection candidate notified by the notification unit of each of the robots, and wherein each of the robots further comprises an inspection selection unit for selecting the electrode inspection candidate, and wherein each inspection selection unit is configured to select the electrode inspection candidate based on at least one of a number of welding points, a number of times of electrode polishing, and position change amounts of the electrodes.

2. The spot welding system according to claim 1, wherein the inspection instruction unit of the inspection management device is configured, in the case where a predetermined electrode inspection is notified as the electrode inspection candidate by at least one of the robots, to instruct robots including the at least one robot that has notified the predetermined electrode inspection as the electrode inspection candidate, to execute the predetermined electrode inspection.

3. The spot welding system according to claim 1, wherein the inspection instruction unit of the inspection management device is configured, in the case where a predetermined electrode inspection is notified as the electrode inspection candidate by more than a predetermined number of robots or by a number of robots with respect to a total number of the robots exceeding a predetermined ratio, to instruct robots including at least the robots that have notified the predetermined electrode inspection as the electrode inspection candidate, to execute the predetermined electrode inspection.

4. The spot welding system according to claim 1, wherein the inspection instruction unit of the inspection management device is configured to determine an electrode inspection being notified most as the electrode inspection candidate by the robots, and instruct robots including at least the robots that have notified the electrode inspection being determined as the electrode inspection candidate, to execute the electrode inspection.

5. The spot welding system according to claim 1, wherein the inspection instruction unit of the inspection management device is configured to instruct execution of an electrode inspection notified as the electrode inspection candidate by a predetermined robot among the robots, to robots including at least the predetermined robot.

6. The spot welding system according to claim 1,
wherein the spot welding gun comprises a movable electrode driven by a servo motor and an opposite electrode arranged opposite to the movable electrode, the movable electrode being configured to move closer to or away from the opposite electrode, and wherein the inspection execution unit of each of the robots is configured to be able to execute an electrode inspection for detecting a position change amount relative to an electrode position of each of the movable electrode and the opposite electrode at a reference time.

7. The spot welding system according to claim 6,
wherein the inspection execution unit of each of the robots comprises:
a first acquisition unit for acquiring a first position of the movable electrode when the movable electrode and the opposite electrode of the spot welding gun contact with each other at the reference time;
a second acquisition unit for acquiring a second position of the movable electrode when the movable electrode and the opposite electrode of the spot welding gun contact with each other at an inspection time;
a difference calculation unit for calculating a difference between the first position and the second position of the movable electrode; and
a position change amount calculation unit for distributing the difference to the movable electrode and the opposite electrode according to a predetermined ratio, so as to calculate position change amounts of the movable electrode and the opposite electrode relative to positions of the electrodes at the reference time.

8. The spot welding system according to claim 6,
wherein the inspection execution unit of each of the robots comprises:
a first acquisition unit for acquiring a first position of the movable electrode when the movable electrode and the opposite electrode of the spot welding gun contact with each other at the reference time;
a second acquisition unit for acquiring a second position of the movable electrode when the movable electrode and the opposite electrode of the spot welding gun contact with each other at the inspection time;
a first difference calculation unit for calculating a first difference between the first position and the second position of the movable electrode;
a third acquisition unit for acquiring a third position of the movable electrode when the movable electrode of the spot welding gun is brought into contact with a jig provided at a predetermined position at the reference time;
a fourth acquisition unit for acquiring a fourth position of the movable electrode when the movable electrode of the spot welding gun is brought into contact with the jig provided at the predetermined position at the inspection time;
a second difference calculation unit for calculating a second difference between the third position and the fourth position of the movable electrode; and
a position change amount calculation unit for calculating position change amounts of the movable electrode and the opposite electrode relative to positions of the electrodes at the reference time, based on the first difference and the second difference.

9. The spot welding system according to claim 6,
wherein the inspection execution unit of each of the robots comprises:
a first image acquisition unit for acquiring images of the movable electrode and the opposite electrode of the spot welding gun at the reference time,
a first electrode position detection unit for detecting a first electrode position of each of the movable electrode and the opposite electrode at the reference time, based on the images acquired by the first image acquisition unit;
a second image acquisition unit for acquiring images of the movable electrode and the opposite electrode of the spot welding gun at the inspection time;
a second electrode position detection unit for detecting a second electrode position of each of the movable electrode and the opposite electrode at the inspection time, based on the images acquired by the second image acquisition unit; and
a position change amount calculation unit for calculating position change amounts of the movable electrode and the opposite electrode relative to positions of the electrodes at the reference time, based on the first electrode position and the second electrode position.

10. The spot welding system according to claim 9, wherein the first electrode position detection unit and the second electrode position detection unit are configured to detect a distance between a tip and a base of each of the movable electrode and the opposite electrode, respectively, by image processing.

\* \* \* \* \*